United States Patent [19]

Truty

[11] Patent Number: 5,089,680
[45] Date of Patent: Feb. 18, 1992

[54] INDEXED ROTATABLE CURRENT PICK-UP FOR A TRAVELLING WIRE ELECTRICAL DISCHARGE MACHINING APPARATUS

[75] Inventor: Thomas J. Truty, South Barrington, Ill.

[73] Assignee: T-Star Industrial Electronics Corporation, Wheeling, Ill.

[21] Appl. No.: 705,768

[22] Filed: May 28, 1991

[51] Int. Cl.$^5$ .............................................. B23H 7/10
[52] U.S. Cl. .................................................. 219/69.12
[58] Field of Search ................... 219/69.12, 137.61; 204/206, 224 M

[56] References Cited

U.S. PATENT DOCUMENTS

| | | | |
|---|---|---|---|
| 4,367,390 | 1/1983 | Balleys et al. | 219/69.12 |
| 4,422,918 | 12/1983 | Inoue | 219/69.12 |
| 4,469,927 | 9/1984 | Obara et al. | 219/69.13 |
| 4,563,569 | 1/1986 | Shiramizu et al. | 219/137.61 |
| 4,605,834 | 8/1986 | Inoue | 219/69.12 |
| 4,652,717 | 3/1987 | Briffod | 219/69.12 |
| 4,733,038 | 3/1988 | Giradin | 219/69.12 |
| 4,736,085 | 4/1988 | Inoue et al. | 219/69.12 |
| 4,896,013 | 1/1990 | Fricke et al. | 219/69.12 |
| 4,994,643 | 2/1991 | Truty et al. | 219/69.12 |

FOREIGN PATENT DOCUMENTS 61-76216 4/1986 Japan.
61-168427 7/1986 Japan.

Primary Examiner—Geoff Evans
Attorney, Agent, or Firm—George Pappas

[57] ABSTRACT

A cartridge assembly for a travelling wire electrode electrical discharge machining apparatus includes a cartridge barrel having a first open end and a second open end, and a wire guide mounted in the first open end of the cartridge barrel for guiding the wire electrode. A current pick-up holder is mounted in the second open end of the cartridge barrel and includes an index pin for engagement with a current pick-up. A current pick-up is provided for delivering current to the wire electrode, the current pick-up being mounted in the pick-up holder and including a longitudinal bore for engagement with the wire electrode. The current pick-up includes a first end and a second end, with a tool engagement portion located at the first end of the current pick-up for engagement of a tool to rotate the current pick-up relative to the current pick-up holder. An index pin receiving portion is located at the second end of the current pick-up for receiving the index pin of the current pick-up holder. The current pick-up can be rotated through successive indexed orientations to expose new unworn inner peripheral surfaces of the bore of the current pick-up to extend the life of the current pick-up.

25 Claims, 1 Drawing Sheet

INDEXED ROTATABLE CURRENT PICK-UP FOR A TRAVELLING WIRE ELECTRICAL DISCHARGE MACHINING APPARATUS

BACKGROUND OF THE INVENTION

1. Field of the Invention

The present invention relates generally to a travelling wire electrical discharge machining apparatus, and more particularly to an improved electrical current pick-up therefor.

2. Description of the Related Art

An electrical discharge machining apparatus removes material from a metallic workpiece by spark erosion as a travelling wire electrode is fed from a spool or similar supply through the workpiece. The wire is also advanced relative to the workpiece in a direction generally transverse to the wire. During the machining operation, it is necessary to deliver electrical current to the travelling wire electrode. An electrically conductive current pick-up in physical contact with the travelling wire is employed to transfer current from a power supply to the wire at a point proximate the workpiece. One form for such a current pick-up is a cylinder having a central bore through which the wire electrode passes.

To maintain constant electrical contact between the current pick-up and the travelling wire electrode, wire guides for guiding the wire electrode through the bore of the current pick-up are used. The center line of the guides is offset laterally relative to the center line of the bore of the current pick-up, causing the wire electrode to bear against the inner surface of the bore.

During machining, the wire electrode is travelling at approximately 20 cm/minute across the inner peripheral surface of the central bore of the current pick-up. The inner peripheral surface of the current pick-up is therefore subjected to wear by a combination of mechanical and electrical forces. To extend the useful life of the current pick-up, it is typically constructed of an extremely hard and wear-resistant material such as carbide. Eventually, however, the travelling wire electrode erodes a slot in the inner peripheral surface of the carbide current pick-up at the point of contact to a sufficient extent that electrical conduction between the carbide current pick-up and the wire electrode is detrimentally affected. Upon that occurrence, the current pick-up is ordinarily at the end of its useful life span, and must ordinarily be replaced, even though most of the inner peripheral surface of the bore of the current pick-up is still in good condition.

It would be desirable to provide an improved current pick-up arrangement wherein the useful life span of the current pick-up could be extended by making use of the unworn portions of the current pick-up after a portion has become worn beyond usefulness. This and other desires are satisfied by the present invention.

SUMMARY OF THE INVENTION

It is an object of the present invention to provide an improved current pick-up for use with a travelling wire electric discharge machining apparatus that can be rotated to expose different surfaces for engagement with the wire electrode to increase the life of the current pick-up.

It is a further object to provide such a rotatable current pick-up that permits new unworn surfaces to be successively exposed in turn without danger of reexposing previously worn surfaces.

It is yet another object of the present invention to provide such a rotatable current pick-up that provides a positive indication that all available surfaces have been used, thereby making clear that replacement of the current pick-up is in order.

Briefly, the present invention is directed to an improved current pick-up for delivering electrical current from a current supply to a travelling wire electrode of an electrical discharge machining apparatus. The current pick-up is typically mounted in a cartridge assembly including a wire guide and a current pick-up holder.

In accordance with one aspect of the present invention, an improved current pick-up for an electrical discharge machining apparatus for delivering an electrical current to a wire electrode includes a cylindrical body including a first end and a second end. A longitudinal bore in the cylindrical body extends from the first end to the second end of the body for the passage of the wire electrode, the longitudinal bore including an inner peripheral surface against at least a portion of which the wire electrode bears while passing through the bore. A tool receiving means is provided at the first end of the cylindrical body for receiving a tool for rotating the cylindrical body to expose different portions of the inner peripheral surface to the wire electrode. An index pin receiving means is provided at the second end of the cylindrical body for receiving an index pin for indexing the cylindrical body during rotation at discrete orientations corresponding to the different portions of the inner peripheral surface.

Additional objects and advantages of the present invention will be apparent from the following descriptions and drawings of a preferred embodiment.

DESCRIPTION OF THE PREFERRED EMBODIMENT

Figure 1:
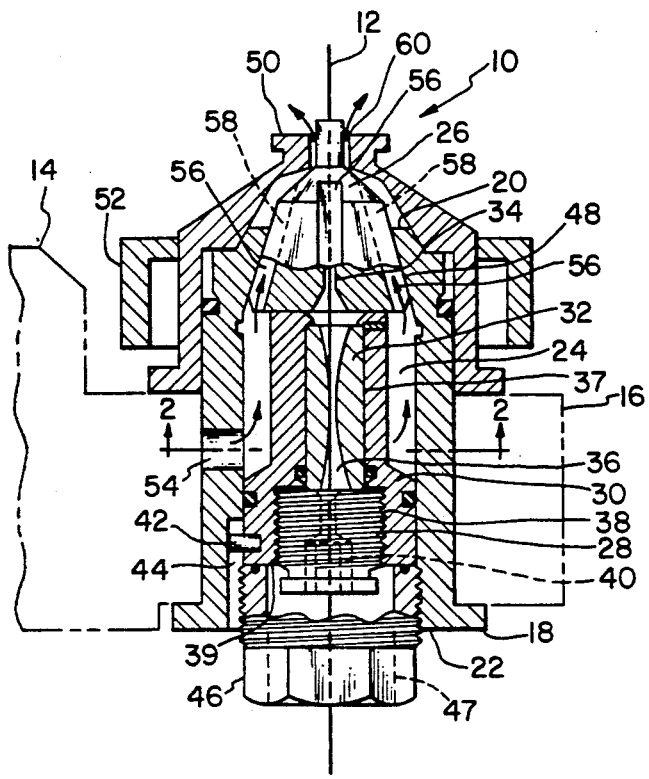
FIG. 1 is a vertical cross-sectional view of a cartridge assembly including a current pick-up constructed in accordance with the present invention.
Figure 2:
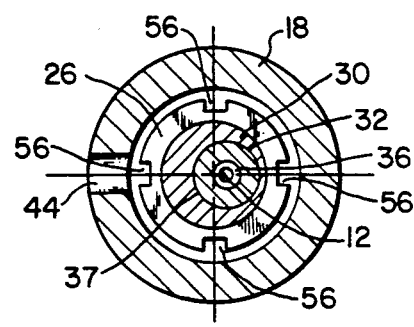
FIG. 2 is view taken generally along line 2—2 of FIG. 1 and viewed in the direction of the arrows.

Referring to FIGS. 1 and 2, a cartridge assembly generally designated by the reference numeral 10 is illustrated. The cartridge assembly 10 is used in an electrical discharge machining apparatus to guide a wire electrode 12 to a workpiece, to deliver an electrical current to the wire electrode 12, and to direct a column of de-ionized cooling fluid around the wire electrode 12. The cartridge assembly 10 is a lower cartridge assembly fixed to an electrical discharge machining apparatus by a lower cartridge holding fixture 14 and a lower clamp 16. The lower cartridge holding fixture 14 and lower clamp 16 hold the lower cartridge assembly 10 in a fixed position below a workpiece. It will be understood by those skilled in the art that an upper cartridge assembly similar to lower cartridge assembly 10 is also clamped on an electrical discharge machining apparatus above the workpiece. In operation, the wire electrode 12 passes through the lower cartridge assembly 10, through a workpiece, and into an upper cartridge assembly.

The cartridge assembly 10 includes a cartridge barrel 18 that serves as a housing for the components of the cartridge assembly 10. The cartridge barrel 18 is cylindrical in configuration with an upper open end 20 and a lower open end 22. The cartridge barrel 18 includes a central longitudinal bore 24 defining a chamber through which the wire electrode 12 passes.

To guide the wire electrode 12 a wire guide 26 is mounted in the first or upper open end 20 of the cartridge barrel 18. A pre-guide 28 (also for guiding the wire electrode 12) is threaded into an enlarged, eccentrically disposed bore 38 of a pick-up holder 30 and positioned adjacent a lower, open end 39 of the pick-up holder 30. The pick-up holder 30 also includes a longitudinal central bore 37. The diameter of the bore 37 is substantially identical to the outer diameter of a current pick-up 32 allowing the current pick-up 32 to be slidably inserted in the bore 37.

The current pick-up 32 is held by the pick-up holder 30 in the central bore 24 of the cartridge barrel 18 between the pre-guide 28 and the wire guide 26. The current pick-up 32 is electrically connected to a source of electrical current and is adapted to deliver a current or charge to the wire electrode 12. In order to deliver current to the wire electrode 12, the wire electrode 12 must engage the inner peripheral surface of a central bore 36 of the current pick-up 32 as the wire electrode 12 moves through the cartridge assembly 10. To ensure the desired contact of the wire electrode 12 with the inner peripheral surface of the current pick-up bore 36, the wire guide 26 includes a central bore 34 that is coaxial with the longitudinal, central bore 24 of the cartridge barrel 18. The bore 36 of the current pick-up 32 is coaxial with the central axis of the current pick-up 32. The central bore 37 of the pick-up holder 30 is offset eccentrically in a first direction from the central axis of the pick-up holder 30. The enlarged bore 38 is also offset eccentrically in a second direction opposite to the first direction from the central axis of the pick-up holder 30. This opposite eccentricity of the bores 37 and 38 positions the moving wire electrode 12 to engage the inner peripheral surface of the central bore 36 of the current pick-up 32.

To insure correct alignment of the central bore 37 of the pick-up holder 30 and the central bore 34 of wire guide 26, the current pick-up holder 30 includes a key 42 that fits into a key-way 44 formed in the cartridge barrel 18. The key 42 and key-way 44 coact to ensure alignment of the current pick-up holder 30 and the wire guide 26.

Once the components of the cartridge assembly 10 are assembled they are retained in position by a retainer nut 46 threadedly mounted in the lower open end 22 of the cartridge barrel 18. The retainer nut 46 exerts a force in the longitudinal direction to force the wire guide 26 into a tapered upper portion 48 of the cartridge barrel 18 fixing the components of the cartridge assembly 10 against relative movement. The retainer nut 46 includes an axial passage or opening 47 allowing access to the current pick-up 32 without the need to move the retainer nut 46 or any of the components in the cartridge assembly 10 other than the pre-guide 28.

During operation of an electrical discharge machining apparatus, it is necessary to cool the wire electrode 12 and to flush the cutting area of the wire electrode 12 and a workpiece. These functions are accomplished by de-ionized fluid directed in a column around the wire electrode 12 as it leaves the cartridge assembly 10. To form a column of de-ionized fluid around the wire electrode 12, a nozzle 50 is secured adjacent the upper open end 20 of the cartridge barrel 18 by a nozzle retainer 52. The cartridge barrel 18 includes an opening 54 for communicating pressurized de-ionized fluid to the central bore or chamber 24 of the cartridge barrel 18. Pressurized de-ionized fluid flows from the chamber 24 through passages or notches 56 defined in the wire guide 26. The fluid exits the wire guide 26 through a series of four equally spaced slots 58. The de-ionized fluid then flows out a nozzle opening 60 which directs the de-ionized fluid in a column about the wire electrode 12.

Figure 3:
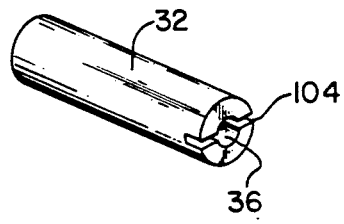
FIG. 3 is a perspective view of one end of the current pick-up of the cartridge assembly of FIG. 1.

Since the wire electrode 12 engages a portion of the inner peripheral surface of the bore 36 of the current pick-up 32, wear does occur along that surface. To minimize wear, the current pick-up 32 is fabricated of carbide. To prolong the life of the current pick-up 32 of the present invention, the current pick-up 32 includes a slot 104 in the end of the current pick-up 32 adjacent the retainer nut 46 (FIG. 3). The slot 104 can be of any type of configuration to accommodate a tool. In the embodiment illustrated in FIG. 3, the slot 104 will accommodate the straight blade of a screw driver. The slot 104 allows the current pick-up 32 to be rotated in the pick-up holder 30 to expose a different portion of the inner peripheral surface of bore 36 to the wire electrode 12. Since the alignment of the components in the cartridge assembly 10 is critical, it is desirable to rotate the pick-up 32 without moving the remaining components. The opening 47 in the retainer nut 46 allows access to the pre-guide 28. The pre-guide 28 may be threaded out of the lower end 39 of the pick-up holder 30 by a tool, thereby exposing the slot 104 in the current pick-up 32. A tool can be positioned in the slot 104 and the current pick-up 32 rotated to expose another portion of the inner peripheral surface of the current pick-up 32 to the moving wire electrode 12. Thereafter, the pre-guide 28 can be threaded into the bore 38 and operation of the electrical discharge wire cutting machining commenced. This feature allows the current pick-up 32 to be used several times before it must be replaced, and to rotate the pick-up 32 without mis-aligning the other components in the cartridge assembly 10.

Since the operation of rotating pick-up 32 to expose a new unworn portion of the inner peripheral surface of bore 36 to wire electrode 12 is conducted at relatively infrequent intervals, it may be difficult to discern, without removing pick-up 32 from pick-up holder 30, the orientation of the previously worn portion or portions of the pick-up 32. Thus, there would be some uncertainty at the time that a new rotation falls due as to how many times pick-up 32 had previously been rotated, and in what direction. This uncertainty would result either in pick-up 32 being rotated erroneously to expose a previously worn surface, or perhaps in being over-rotated so as to waste available unworn surface. Resolving the uncertainty by removal and inspection of pick-up 32 adds unnecessary time and difficulty to the task, as well as requiring undesirable moving of the remaining components of cartridge assembly 10.

Figure 4:
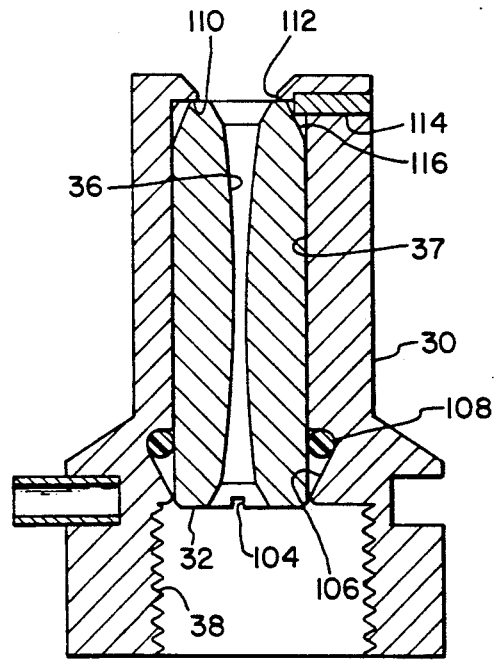
FIG. 4 is an enlarged vertical cross-sectional view of the current pick-up holder of the cartridge assembly of FIG. 1.
Figure 5:
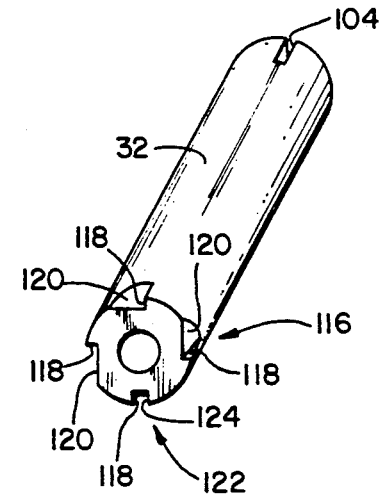
FIG. 5 is a perspective view of that end of the current pick-up of the cartridge assembly of FIG. 1 opposite the end illustrated in FIG. 3.

Referring to FIGS. 4 and 5, pick-up holder 30 and pick-up 32 are shown in greater detail, revealing an indexing arrangement that provides positive mechanical positioning of pick-up 32 at discrete rotational intervals, as well as providing mechanical feedback that is indicative of whether additional unworn surfaces of pick-up 32 remain available for use. Pick-up holder 30 includes round bore 37 therein in which pick-up 30 is slidably received via enlarged threaded bore 38. An annular groove 106 intermediate bore 37 and bore 38 has received therein an O-ring 108 which surrounds and elastically engages one end of pick-up 32 to hold pick-up 32 within pick-up holder 30 and to bias pick-up 32 upwardly. Annular groove 106 includes a portion below O-ring 108 having a generally conical cross-section that tapers radially inwardly in the downward direction. O-ring 108 and the conical portion of groove 106 cooperate as follows. O-ring 108 frictionally engages the outer cylindrical peripheral surface of pick-up 32 and frictionally engages the inner cylindrical surface of bore 37 of pick-up holder 30. Thus, pick-up 32 is frictionally retained against dropping out of bore 37 when pre-guide 28 is removed. Any downward movement of pick-up 3 results in O-ring 108 "rolling," which causes O-ring 108 to become increasingly compressed between pick-up 32 and the conical portion of annular groove 106. The elastic nature of O-ring 108 resists such compression and results in a force being generated which tends to roll O-ring 108 in the opposite direction thereby forcing pick-up 32 upwardly. The end of pick-up holder 32 opposite enlarged threaded bore 38 includes an end stop wall 110 having an aperture 112 therethrough aligned with bore 36 of pick-up 32. End stop wall 110 engages the end surface of pick-up 32 and retains pick-up 32 within pick-up holder 30 while pick-up 32 is forced against end stop wall by pre-guide 28 threadedly received in bore 38. A small diameter pin 114 protrudes radially through the wall of pick-up holder 30 and extends a short distance into bore 37 immediately adjacent end stop surface 110. In the preferred embodiment, pin 114 is partially imbedded in end stop wall 110 parallel therewith such that pin 114 presents a more or less semi-cylindrical exposure within bore 37. That portion of pin 114 extending within bore 37 engages one of a plurality of index notches 116 located at one end of pick-up 32 at the junction of the end face and outer peripheral cylindrical surface thereof to prevent unintentional rotation of pick-up 32 within bore 37.

With particular reference to FIG. 5, index notches 116 are shown in greater detail. Each notch 116 includes a stop face 118 extending parallel to the longitudinal axis of pick-up 32 and parallel to a radius. All but one of the plurality of index notches 116 also include a cam face 120 disposed substantially perpendicular to stop faces 118 and inclined inwardly toward the end face of pick-up 32 at an angle of approximately 30° relative to the longitudinal axis. Each cam face 120 forms a ramp which, in engagement with pin 114, tends to cause pick-up 32 to be lifted away from end stop surface 110 of pick-up holder 30 as pick-up 32 is rotated within bore 37, such as by a screw driver received in slot 104. It should be noted that the ramp action permits a simultaneous lifting and turning of pick-up 32 in one direction of rotation only, as rotation in the opposite direction is halted by a perpendicular engagement between pin 114 and stop face 118. The relative orientation and arrangement of each stop face 118 and cam face 120 of the plurality of index notches 116 is the same from notch to notch, such that pick-up 32 can be rotated in one direction only with pin 114 riding up and out of each successive index notch 116 via the cam face 120, and thence being received into the next index notch 116. The longitudinal movement of pick-up 32 as it is being rotated serves to provide a positive indication by sight and by feel that pin 114 has left one index notch and entered the next. Thus, index notches 116 provide a means by which pick-up 32 can be rotated from time to time in one direction only, with positive mechanical indexing of the degree of rotation.

One of the plurality of index notches 116 is designated as a "home notch" 122, and is different in configuration in that it includes a second stop face 124 oriented similarly to stop face 118 and spaced therefrom. Home notch 122 does not include a cam face. During initial installation of pick-up 32 in pick-up holder 30, pin 114 is engaged with that index notch 116 having its stop face 118 located next adjacent home notch 122. Thus, pick-up 32 can only be rotated in a direction such that pin 114 initially engages successive index notches located in a direction away from home notch 122. Therefore, home notch 122 is the last notch to be engaged by pin 114, and once so engaged further rotation of pick-up 32 is not possible in any direction due to a perpendicular engagement between pin 114 and stop faces 118 and 124. There is thus provided a positive mechanical indication that all of the available inner peripheral surface of pick-up 32 has been used, and pick-up 32 has reached the end of its useful life. At that point in time, removal and replacement of pick-up 32 would be in order.

While the present invention has been particularly described in the context of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which come within the appended claims or the equivalents thereof.

What is claimed is:

1. A current pick-up for an electrical discharge machining apparatus for delivering an electrical current to a wire electrode, said current pick-up comprising:
    a cylindrical body including a first end and a second end,
    a longitudinal bore in said cylindrical body extending from said first end to said second end of said body for the passage of said wire electrode, said longitudinal bore including an inner peripheral surface against at least a portion of which said wire electrode bears while passing through said bore;
    tool receiving means at said first end of said cylindrical body for receiving a tool for rotating said cylindrical body to expose different portions of said inner peripheral surface to said wire electrode; and
    index pin receiving means at said second end of said cylindrical body for receiving an index pin for indexing said cylindrical body during rotation at discrete orientations corresponding to said different portions of said inner peripheral surface.

2. The current pick-up of claim 1, in which said index pin receiving means includes a plurality of circumferentially spaced index notches.

3. The current pick-up of claim 2, in which said cylindrical body includes an end face at said second end adjoining an outer peripheral cylindrical surface, and in which each of said plurality of index notches is located at the junction of said end face and said outer peripheral cylindrical surface.

4. The current pick-up of claim 3, in which said cylindrical body includes a longitudinal axis and each of said index notches includes a first stop face extending substantially parallel to the longitudinal axis and substantially parallel to a radius of said cylindrical body.

5. The current pick-up of claim 4, in which at least one of said plurality of index notches includes a cam face inclined at an angle relative to the longitudinal axis.

6. The current pick-up of claim 5, in which said cam face is inclined inwardly toward said end face of said current pick-up.

7. The current pick-up of claim 6, in which said cam face is disposed substantially perpendicular to said stop face.

8. The current pick-up of claim 5, in which one of said plurality of index notches includes a second stop face generally parallel to said first stop face and spaced therefrom.

9. A cartridge assembly for an electrical discharge machining apparatus having a wire electrode, said cartridge assembly comprising:

a cartridge barrel having a first open end and a second open end;

a wire guide mounted in said first open end of said cartridge barrel for guiding said wire electrode;

a current pick-up holder mounted in said second open end of said cartridge barrel and including an index pin; and a current pick-up for delivering current to said wire electrode, said current pick-up being mounted in said pick-up holder and including a longitudinal bore for engagement with said wire electrode, said current pick-up including a first end and a second end, a tool engagement portion at said first end of said current pick-up for engagement of a tool to rotate said current pick-up relative to said current pick-up holder, and an index pin receiving portion at said second end of said current pick-up for receiving said index pin of said current pick-up holder.

10. The cartridge assembly of claim 9, in which said index pin receiving portion of said current pick-up includes a plurality of circumferentially spaced index notches.

11. The cartridge assembly of claim 10, in which said current pick-up includes a cylindrical body having an end face at said second end adjoining an outer peripheral cylindrical surface, and in which each of said plurality of index notches is located at the junction of said end face and said outer peripheral cylindrical surface.

12. The cartridge assembly of claim 11, in which said cylindrical body includes a longitudinal axis and each of said index notches includes a first stop face extending substantially parallel to the longitudinal axis and substantially parallel to a radius of said cylindrical body.

13. The cartridge assembly of claim 12, in which at least one of said plurality of index notches includes a cam face inclined at an angle relative to the longitudinal axis.

14. The cartridge assembly of claim 13, in which said cam face is inclined inwardly toward said end face of said current pick-up.

15. The cartridge assembly of claim 14, in which said cam face is disposed substantially perpendicular to said stop face.

16. The cartridge assembly of claim 9, in which said current pick-up holder includes a substantially cylindrical bore in which said pick-up is received, said bore of said pick-up holder including an annular groove therein, and further including an O-ring disposed in said annular groove in engagement with said pick-up.

17. The cartridge assembly of claim 16, in which said annular groove of said pick-up holder includes a substantially conical shaped portion.

18. The cartridge assembly of claim 13, in which one of said plurality of index notches includes a second stop face generally parallel to said first stop face and spaced therefrom.

19. In an electrical discharge machining apparatus including a wire electrode for removing material from a workpiece by spark erosion, a source of electrical current, a current pick-up for delivering current from said source of electrical current to said wire electrode, and a current pick-up holder, the improvement comprising:

said current pickup having a longitudinal bore therethrough for receiving said wire electrode in electrical contact therewith and being rotatable within said current pick-up holder about the longitudinal bore, said current pick-up having a plurality of index notches disposed circumferentially thereabout; and said current pick-up holder including an index pin successively engagable with each of said plurality of indexing notches of said current pickup upon rotation of said current pick-up.

20. The electrical discharge machining apparatus of claim 19, in which said current pick-up includes a cylindrical body having an end face at said second end adjoining an outer peripheral cylindrical surface, and in which each of said plurality of index notches is located at the junction of said end face and said outer peripheral cylindrical surface.

21. The electrical discharge machining apparatus of claim 20, in which said cylindrical body includes a longitudinal axis and each of said index notches includes a first stop face extending substantially parallel to the longitudinal axis and substantially parallel to a radius of said cylindrical body.

22. The electrical discharge machining apparatus of claim 21, in which at least one of said plurality of index notches includes a cam face inclined at an angle relative to the longitudinal axis.

23. The electrical discharge machining apparatus of claim 22, in which said cam face is inclined inwardly toward said end face of said current pick-up.

24. The electrical discharge machining apparatus of claim 23, in which said cam face is disposed substantially perpendicular to said stop face.

25. The electrical discharge machining apparatus of claim 24, in which one of said plurality of index notches includes a second stop face generally parallel to said first stop face and spaced therefrom.

* * * * *

UNITED STATES PATENT AND TRADEMARK OFFICE
CERTIFICATE OF CORRECTION

PATENT NO. : 5,089,680

DATED : February 18, 1992

INVENTOR(S) : Thomas J. Truty

It is certified that error appears in the above-identified patent and that said Letters Patent is hereby corrected as shown below:

Col. 5, line 24, change "3" to --32--.

Signed and Sealed this

Twelfth Day of October, 1993

Attest:

BRUCE LEHMAN

Attesting Officer     Commissioner of Patents and Trademarks